Figure 1:
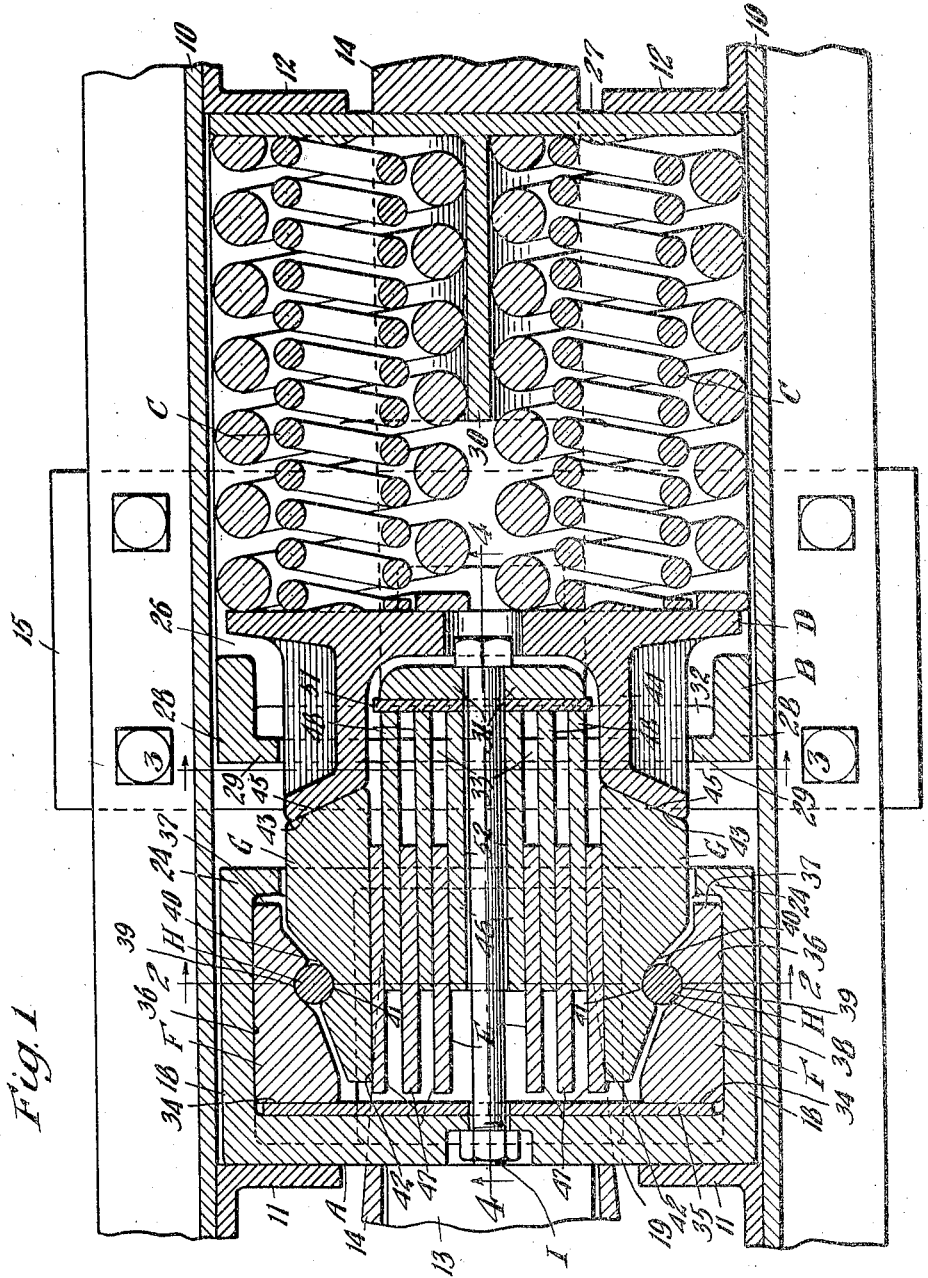

March 9, 1926.

S. B. HASELTINE

FRICTION SHOCK ABSORBING MECHANISM

Filed April 30, 1923    2 Sheets-Sheet 1

1,575,757

Witnesses
Wm. Geiger

Inventor
Stacy B. Haseltine
By George I. Haight
His Atty

March 9, 1926.  1,575,757
S. B. HASELTINE
FRICTION SHOCK ABSORBING MECHANISM
Filed April 30, 1923    2 Sheets-Sheet 2
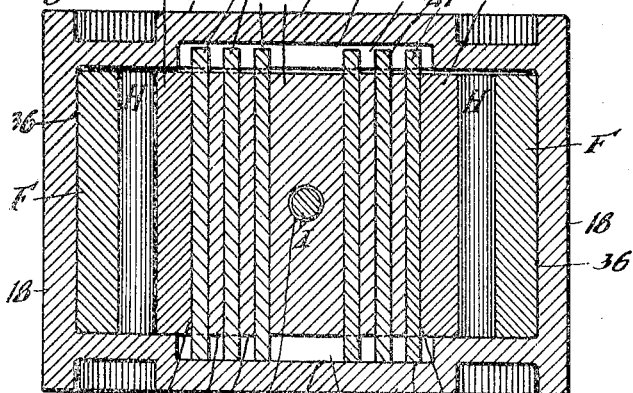
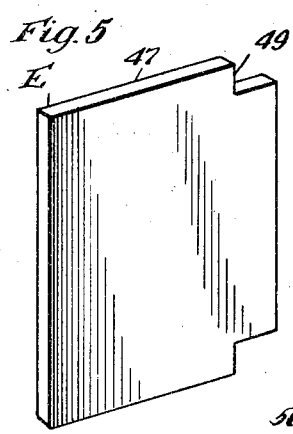
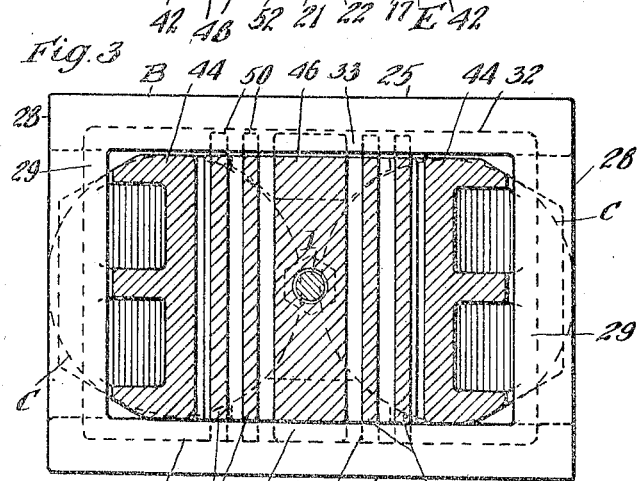
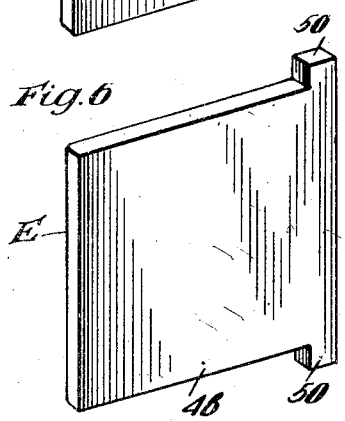
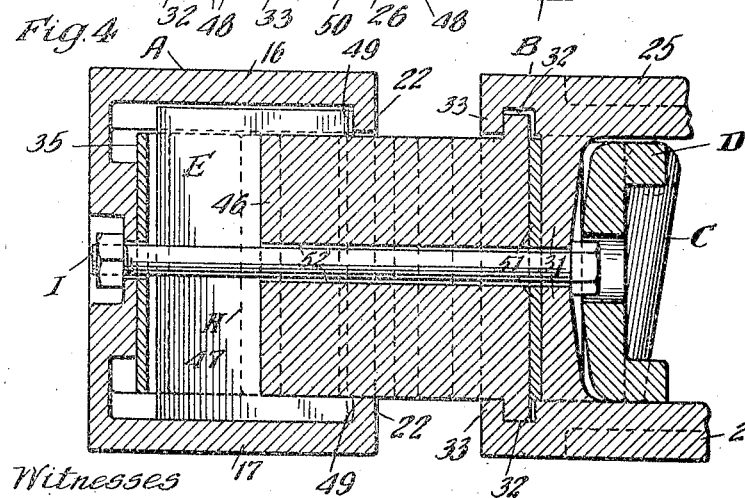
Inventor
Stacy B. Haseltine
By George I. Haight
His Atty.
Witnesses
Wm. Geiger Patented Mar. 9, 1926.

1,575,757

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed April 30, 1923. Serial No. 635,517.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock-absorbing mechanisms.

One object of the invention is to provide a shock absorbing mechanism of the spring friction type, wherein are employed a plurality of alternated, intercalated, relatively stationary and movable friction elements in combination with pressure-creating means co-operable therewith and so arranged as to augment the friction between the said elements by opposed directed pressure on said elements, during the compression stroke.

Another and more specific object of the invention is to provide a mechanism of the character indicated, employing a plurality of intercalated, relatively movable friction plates, comprising two sets, wherein one set is carried by the front follower for movement relatively to the other set, during the compression of the mechanism, and is returned to normal position directly by said follower, whereby direct engagement of the spring follower with the plates is entirely eliminated.

Other objects and advantages of the invention will more clearly appear from the description and claims hereinafter following.

In the drawings, forming a part of this specification, Fig. 1 is a horizontal, longitudinal, sectional view of a portion of a railway draft rigging showing my improvements in connection therewith. Figs. 2 and 3 are vertical, transverse, sectional views corresponding substantially to the lines 2—2 and 3—3 respectively, of Fig. 1. Fig. 4 is a vertical, longitudinal sectional view corresponding substantially to the line 4—4 of Fig. 1. Figs. 5 and 6 are detail, perspective views, respectively, of one of the friction plates associated with the front follower and one of the friction plates fixed to the rear follower member.

In said drawings 10—10 denote channel draft sills of a railway car under-frame, to the inner faces of which are secured front stop lugs 11 and rear stop lugs 12. The inner end of a drawbar is indicated at 13, the same having operatively associated therewith a hooded cast yoke 14. The shock absorbing mechanism proper is mounted within the yoke 14 and the parts are supported in operative position by means of a detachable saddle plate 15.

The shock absorbing mechanism proper, as shown, comprises, broadly, a front follower casting A; a column load sustaining member B which also functions as the rear follower of the mechanism; twin arranged springs C—C; a spring follower D; a group of intercalated friction plates E; a pair of wedge blocks F; a pair of wedge shoes G; a pair of anti-friction rollers H interposed between the wedge blocks and the wedge shoes; and a retainer bolt I.

The front follower casting A is in the form of a boxlike member open at the rear side, having spaced top and bottom walls 16 and 17, side walls 18—18, and a front wall 19. The central portion of the upper wall 16 is upwardly offset with reference to the main portion of the wall, thereby providing a longitudinally extending, relatively wide recess 20. The bottom wall 17 is similarly offset in a downward direction, thereby providing a corresponding recess 21. The recesses 20 and 21 terminate a short distance from the rear end of the top and bottom walls 16 and 17, thereby providing downwardly and upwardly projecting ribs 22 on the walls 16 and 17, respectively. At their rear ends, the side walls 18 are provided with vertically extending, inwardly projecting flanges 24 adapted to strengthen the follower against bursting stresses, and to afford additional bearing against rear follower member B at end of compression stroke.

The column-load-sustaining member B, which functions as the rear follower, is in the form of a casing, having top and bottom walls 25 and 26, and a rear end wall 27.

The rear wall 27 is adapted to co-act directly with the rear stop lugs 12, in a well known manner. The casing B is open at the opposite sides and at the front end thereof, the side openings being provided to permit the insertion of the springs and follower D. At the front end of the casing B, the top and bottom walls are connected by short, vertically extending, webs or side walls 28 and at their front ends, the side walls 28 are provided with inwardly extending flanges 29. The casing B is also provided with a central partition 30, connecting the top and bottom walls 25 and 26 and formed integral with the rear wall 27. The central partition 30 is provided with concave faces at the opposite sides thereof and adapted to co-act with the spring resistance elements C to hold the same in spaced relation and in proper position. The front end of the partition 30 is spaced rearwardly of the front end of the casing B the proper distance to permit full movement of the spring follower D during the compression of the mechanism, without actually engaging the same. At its forward end, the casing B is also provided with a transversely arranged, vertically extending, central wall 31, spaced inwardly from the outer end of the casing as clearly shown in Fig. 4, and formed integral with the top and bottom walls 25 and 26 of the casing. Between the wall 31 and the outer end of the casing B, the top and bottom walls 25 and 26 are transversely slotted as indicated at 32, thereby providing transversely extending ribs 33, for a purpose hereinafter described.

The wedge blocks F are of like construction and are arranged within the front follower at opposite sides thereof. Each of the wedge blocks F is provided with a flat face 34 at the front end thereof adapted to abut a wear plate 35 interposed between the inner face of the front wall 19 of the follower A and the wedge blocks; a flat side face 36 adapted to abut the inner face of the adjacent side wall 18; a flat rear face 37; and an inner wedge face 38. A roller-receiving recess 39 is formed in each block F adapted to receive one of the rollers H.

The wedge shoes G are of like construction and are arranged on opposite sides of the centrally disposed group of friction plates E. Each of the wedge shoes G is formed on its outer side with a wedge face 40 opposed to and parallel with the wedge face 38 of the corresponding wedge block F. A roller-receiving recess 41 is formed in each of the wedge shoes G, said recesses being opposed to the roller-receiving recesses 39 of the wedge blocks F and thereby serving to maintain the rollers H in proper relation with respect to the wedge blocks and wedge shoes. The wedge shoes G are formed with inner flat faces 42 adapted to co-act with the outermost friction plates of the group of plates, and beveled rear faces 43 adapted to co-act with the spring follower D.

The spring follower D is laterally extended so as to provide a bearing for the forward ends of the twin springs C, as clearly shown in Fig. 1. The follower D is formed preferably, with integral forwardly extending short columns 44, the latter having transversely extending beveled faces 45 at their front ends which are adapted to seat on the correspondingly beveled faces 43 at the rear ends of the wedge shoes G. As clearly shown in Fig. 1, the beveled faces 43 and 45 are inclined inwardly and rearwardly of the gear, thereby tending to force the rear ends of the wedge shoes inwardly toward the axis of the gear and hold the same in flat contact with the outermost plates of the centrally disposed group of friction plates.

The group of friction plates E consists of a centrally disposed, relatively heavy, plate 46 and two sets of intercalated plates arranged at opposite sides of the plate 46, each set comprising three plates 47 and two plates 48. The plates 47 as clearly shown in Fig. 5, are notched at the upper and lower sides, near the rear ends thereof, thereby providing shoulders 49. The plates 47 are carried by the front follower A with the upper and lower edges thereof received, within the respective recesses 20 in the upper and lower walls of said follower. As will be evident, upon reference to Figs. 4 and 5, the shoulders 49 of the plates 47 are so located that a limited amount of movement of the plates is permitted with reference to the follower A, whereby the front ends of the plates 47 are normally slightly spaced from the inner face of the wear plate 35 which abuts the front wall 19 of the follower. The shoulders 49 of the plates 47 are adapted to be engaged by the ribs 22 on the top and bottom walls of the front follower, thereby holding the plates 47 in assembled relation with the follower and effecting outward movement of the plates with the follower to restore the same to normal position. The plates 48 are alternated with the plates 47, as clearly shown in Fig. 1, two of the plates 47 being arranged outermost and engaging with the flat inner faces 42 of the wedge shoes G. As most clearly shown in Figs. 4 and 6, each of the friction plates 48 is provided with a pair of lugs 50 located at the rear end thereof, one of said lugs projecting upwardly from the upper edge and the other projecting downwardly from the lower edge. The lugs 50 are adapted to engage within the slots 32 formed in the upper and lower walls 25 and 26, respectively, of the casing B, and are adapted to abut the rear faces of the ribs 33 thereby retaining the plates 48 in fixed relation with reference to the casing B. A wear plate 51 is interposed between the rear ends of the plates 48 and the outer face of the transverse wall 31 of the casing B.

The central plate 46 of the group of friction plates is of substantially the same construction as the plates 48 and is provided with upwardly and downwardly projecting lugs similar to the lugs 50, adapted to engage within the recesses 32 and hold the plate 46 in fixed position against longitudinal movement with reference to the casing B.

The plates 47 are assembled with the front follower by inserting the same while in a diagonally disposed position and bringing the shoulders 49 into engagement with the inner faces of the ribs 22, by turning the plates so that they are vertically disposed into proper spaced position to receive the plates 46 and 48 therebetween. The plates 46 and 48 are assembled with the follower casing B by inserting the rear ends of the same in the front end of the rear follower casing while diagonally disposed with reference to the vertical, and bringing the lugs 50 in alinement with the slots 32, whereupon the plates are turned until they lie in vertical planes with the lugs 50 within the slots 32. The plates 46 and 48 may then be moved laterally into proper position to engage alternately between the plates 47.

The retainer bolt I is adapted to hold the parts of the mechanism in assembled relation, having one end anchored within the rear follower casing by means of the head thereof engaging behind the wall 31, and having the other end thereof anchored to the front wall 19 of the follower casing A, the shank of said bolt extending through alined recesses in the walls 31 and 19 and through a longitudinal bore 52 in the friction plate 46, an opening being provided in the transverse wall of the spring follower D to accommodate the head of the bolt.

The operation of the device is as follows, assuming an inward or buffing movement of the drawbar. As the front follower A is forced inwardly or rearwardly under the action of the drawbar, the first effect is to produce a laterally, inwardly directed pressure from the wedge blocks F to the wedge shoes G, the resulting slight relative longitudinal movement therebetween being accomplished without appreciable friction on account of the rollers H. The wedge shoes G are picked up and forced rearwardly without any appreciable movement of the plates composing the group E. The advance of the wedge shoes G forces the spring follower D rearwardly, thereby compressing the twin spring resistance C—C. The action described continues with a gradually increasing wedging action, due to the spring resistance, until the plate 35 of the front follower A engages with the outer ends of the plates 47. It will be evident that, at the instant the front follower A engages with the plates 47 so as to move the latter, the desired degree of pressure from both sides will have been imposed upon the centrally disposed group of alternate friction elements. On account of the comparatively large number and area of the surfaces and friction contact, a high total friction resistance will be thereafter afforded during the remainder of the compression stroke. The lateral pressure will be gradually augmented as the plates 47 move inwardly, said pressure being proportionate to the degree of compression of the springs C. During this operation it will be evident that, due to the inclination of the faces 43 and 45 of the spring follower D and the wedge shoes G, respectively, there will be a tendency to force the rear ends of the wedge shoes G inwardly, thereby holding the inner flat faces 42 of the wedge shoes in proper contact with the outermost plates 47.

It will be evident that, during the movement of the front follower A toward the column-load-sustaining member B and the inward movement of the plates 47 therewith, the plates 48 and plate 46 will be held in fixed position relative to the member B by their rear ends abutting the plate 51 interposed between the same and the wall 31, the wall 31 providing a substantial and solid abutment for the same.

The front end of the member B and the rear end of the front follower A are so spaced that, when the gear is fully compressed and before the springs have become solid, the front follower casting A and the member B will abut, thereby transmitting the pressure directly through the front follower and member B to the stop lugs of the draft sills.

Upon removal or discontinuance of the actuating pressure, the springs immediately re-act through the spring follower D and, inasmuch as the wedge blocks F and the wedge shoes G are anti-frictionally mounted with respect to each other, the collapse of the wedge-pressure system is instantaneous, thereby immediately relieving the lateral pressure on the friction elements. The re-action of the springs C through the spring follower D causes the wedge shoes G, the wedge blocks F, and the front follower A to move outwardly independently of any movement of the friction plates, until the ribs 22 of the front follower A engage with the shoulders 49 on the friction plates 47, whereupon the plates are pulled out directly by the front follower A and all of the parts restored to normal position. During the outward movement of the plates 47, with the front follower A, movement of the plates 46 and 48 therewith will be prevented by engagement of the lugs 50 with the ribs 33.

It will be evident that the action of mechanism in a draft movement will be similar to that just described, the only difference being that springs are compressed against the practically stationary spring follower, and those parts which were stationary under the buffing stroke being movable, while the parts which were movable are stationary.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a column-load-sustaining member; of a main follower movable relatively toward and from said member; a plurality of friction elements mounted on said member; means for holding said elements against movement longitudinally of said member, said means including a fixed abutment wall on said member engaging the rear ends of said elements; a plurality of friction elements intercalated with respect to said first named friction elements, said last named elements being connected to the front follower and movable therewith; a pair of wedges carried by said front follower; a spring resistance; a spring follower co-acting with said spring resistance, said spring follower being arranged in spaced relation to all of said elements; and a pair of wedge shoes interposed between said spring follower and said wedges, said wedge shoes bearing on the outermost of said elements.

2. In a friction shock absorbing mechanism, the combination with a column-load-sustaining member; of a main follower movable relatively toward and from said member; a plurality of friction plates mounted on said member and held against movement longitudinally thereof; a plurality of friction plates intercalated with respect to said first named friction plates, said last named plates being connected to the front follower and movable therewith both toward and from said member; a pair of wedges carried by said main follower; a spring resistance; a spring follower co-acting with said spring resistance; said spring follower being arranged in spaced relation to all of said plates; and a pair of wedge shoes interposed between said spring follower and said wedges, and bearing on the outermost of said plates, said shoes having beveled faces at the inner ends thereof adapted to co-act with correspondingly beveled faces on said spring follower.

3. In a friction shock absorbing mechanism, the combination with a column-load-sustaining member having an abutment wall at the front thereof; of a main follower movable relatively toward and from said member; a plurality of friction plates carried by said follower and movable therewith toward and from said member; a plurality of friction elements intercalated with respect to said plates and held against movement longitudinally of said member with the rear ends thereof abutting said walls; a spring resistance; a spring follower; and lateral wedge pressure creating means on opposite sides of said plates and elements, said means being interposed between said spring follower and main follower.

4. In a friction shock absorbing mechanism, the combination with a column-load-sustaining member; of an outer follower movable relatively toward and from said member; a group of intercalated, relatively longitudinally movable friction plates, certain of said plates being anchored to said member and the remaining plates being movable with said outer follower; an abutment wall fixed with respect to said member and extending across the inner ends of said intercalated plates, said wall engaging the inner ends of the plates anchored to said member; means engaged and actuated by said outer follower for placing said plates under lateral pressure; and a yielding resistance co-operable with said pressure-creating means.

5. In a friction shock absorbing mechanism, the combination with a column-load-sustaining member open at one end and provided with an integral abutment wall disposed centrally and inwardly of the opening in the end thereof; of a centrally disposed group of intercalated, relatively longitudinally movable friction plates, certain of said plates being anchored to said member and adapted to transfer the load therefrom to said abutment wall; an outer follower movable toward and from said member; lateral wedge-pressure creating means on opposite sides of said group of plates; a spring resistance within said member; and means interposed between said spring resistance and each of the lateral pressure-creating means for transmitting the spring resistance to said pressure-creating means.

6. In a friction shock absorbing mechanism, the combination with a column-load-sustaining member having abutment means at the front end thereof; of a main follower movable relatively toward and from said member; a plurality of friction plates carried by said follower and movable therewith toward and from said member; a plurality of friction plates intercalated with respect to said first named plates and held against movement longitudinally of said member with the rear ends thereof abutting said abutment means; a spring resistance; a spring follower; and a wedge system for creating lateral pressure on said plates, said system being interposed between said spring follower and main follower.

In witness that I claim the foregoing I have hereunto subscribed my name this 25th day of April 1923.

STACY B. HASELTINE.